United States Patent [19]
Rymes

[11] 3,956,748
[45] May 11, 1976

[54] OMNIDIRECTIONAL TRACKING WEAPON CONTROL SYSTEM

[75] Inventor: William H. Rymes, Arlington, Va.

[73] Assignee: The United States of America as represented by the Secretary of the Navy, Washington, D.C.

[22] Filed: Dec. 29, 1972

[21] Appl. No.: 321,482

[52] U.S. Cl. .................................. 343/7 A; 343/7.4
[51] Int. Cl.² .......................................... G01S 9/02
[58] Field of Search ...................... 343/5 R, 7 A, 7.4

[56] References Cited
UNITED STATES PATENTS

| | | | |
|---|---|---|---|
| 2,737,853 | 3/1956 | Gravenhorst et al. | 343/5 R X |
| 3,378,835 | 4/1968 | Mooney et al. | 343/5 R |
| 3,648,284 | 3/1972 | Dax et al. | 343/5 R |
| 3,710,382 | 1/1973 | Allen | 343/5 R X |

Primary Examiner—T. H. Tubbesing
Attorney, Agent, or Firm—R. Sciascia; R. Beers; S. Scheinbein

[57] ABSTRACT

A rear looking radar antenna system with a look angle of ± 120° is installed on a missile launching aircraft which has a conventional front looking antenna with a look-angle of ± 60°. This permits a full 360° to be covered. The search and track circuitry of the existing weapon control system is shared between the back and front antennas. As a target passes beyond the look-angle of one of the antennas, the other antenna picks it up. The weapon control circuitry is switched from the one to the other antenna at this time.

9 Claims, 6 Drawing Figures

OMNIDIRECTIONAL TRACKING WEAPON CONTROL SYSTEM

BACKGROUND OF THE INVENTION

Th present invention relates generally to the field of aircraft weapon control radar systems and more particularly to such a system which provides target tracking capability for a full 360° in azimuth and elevation.

Pilots of U.S. military aircraft carrying semi-active missiles are experiencing difficulty in launching the missiles against enemy fighters in an air combat maneuvering (ACM) environment. The semi-acitive missile weapon systems currently employed were designed to intercept enemy bombers attempting to destroy or otherwise threaten the U.S. fleet and/or continental defenses. In the mechanization of these systems, the look angle of the search and track fire control radar was established to cover the forward sector of the launching aircraft. In most cases this sector consisted of a cone of microwave illumination ±60° around the aircraft datum line. Missiles can be launched against the airborne target whenever the system indicates to the pilot that the target is in range and that the aircraft is headed in the proper lead pursuit course. These launches were made against non-maneuvering targets at ranges of 3 to 15 miles. As the systems were designed to combat non-maneuvering targets, they performed adequately.

Many of these aircraft are now being used in an ACM environment. They are operating in air space which is occupied by commercial and friendly military aircraft as well as enemy aircraft. Because of the necessity of positive identification all targets must be visually identified prior to launching a missile. This requirement changes the scenario from a nonmaneuvering airborne intercept (AI) environment to an ACM environment. The usual ACM situation develops when the interceptor is tracking the enemy target at long range up to the point of visual identification at which time or shortly thereafter the target passes to the rear of the interceptor exceeding the gimbal limits of the radar. Immediately, the target turns back 180° toward the interceptor as the interceptor continues on its course. After flying the course for a calculated distance, the interceptor turns back toward the target endeavoring to get into a missile firing position. Often, the length of time required for the radar system to re-acquire the target, which can only be accomplished when the target has reached a position in space that falls within the gimbal limits of the interceptor radar, precludes a successful missile launch from being executed. As the target and interceptor turn to get into firing position, the interceptor pilot must wait until the target is within the radar gimbal limits. Then the radar must re-acquire the target, settle down to track the target, generate signals relative to closing rates and compute the proper launch point in angle and range. In the classic case there is not enough time as the aircraft approach each other to execute a successful launch of the missile.

SUMMARY OF THE INVENTION

The present invention puts to use the period of time now wasted between fly-by and the point where the target again enters the AI radar field of view to constantly update the target information in the launch computer so that the instant the target is in an allowable launch position the missile can be fired successfully. This is accomplished by mounting a rear-looking radar antenna system on the rear section of the aircraft. The rear antenna system is a subsystem of the nose-mounted AI radar. The AI radar is typically characterized by limited angular coverage on the order of ±60° in azimuth and elevation centered on the nose aspect of the aircraft. Operating in conjunction with the front antenna and utilizing the AI transmitter and receiver, the rear antenna system provides radar track coverage overlapping that of the front antenna and extending throughout the space not covered by the front radar. Logic circuitry receives antenna azimuth and elevation information and causes the tracking function to be handed over or transferred from the tracking antenna to the non-tracking antenna during the period of overlapping coverage. The non-tracking antenna is slaved to the tracking antenna so that the non-tracking antenna is properly oriented to take over the tracking function upon transfer. As the target moves outside of the AI front angular coverage, target track functions are transferred to the rear antenna system. Track functions are then maintained by the rear antenna system until such time as the target can be brought within the front antenna gimbal capability. Rear antenna system functions are completed with transfer back to the front antenna system.

OBJECTS OF THE INVENTION

An object of the present invention is to provide 360° of radar coverage by an airborne radar.

Another object of the present invention is to increase the target tracking capabilities of interceptor aircraft.

Still another object of the invention is to provide a rear-looking radar tracking capability for aircraft having a limited front-looking radar system.

A further object of the invention is to utilize the receiver and transmitter circuits of an aircraft radar system in conjunction with two antennas on a mutually exclusive, shared basis.

Other objects, advantages, and novel features of the present invention wil become apparent from the following detailed description of the invention when considered in conjunction with the accompanying drawings.

DESCRIPTION OF THE PREFERRED EMBODIMENT

Figure 1:
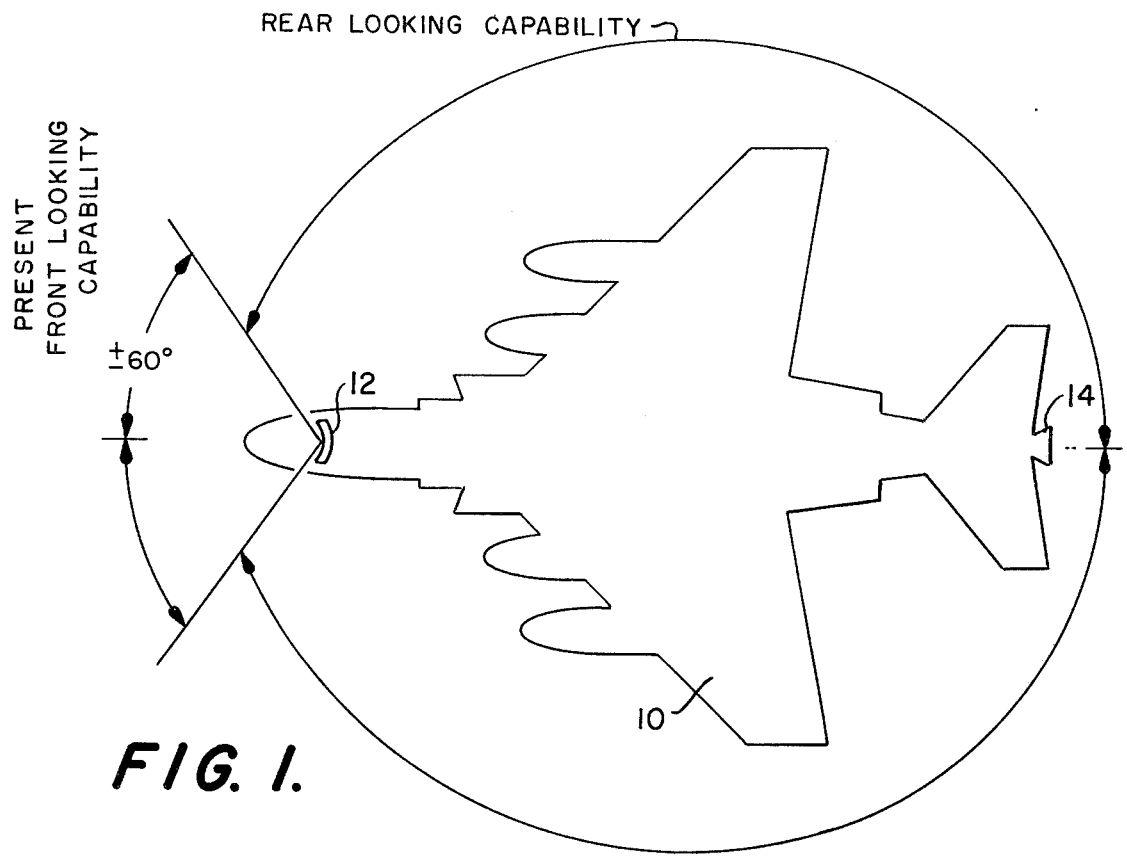
FIG. 1 illustrates the areas of coverage of a representative front-looking radar and of the rear-looking radar.

FIG. 1 shows a typical interceptor aircraft 10 having a nose-mounted AI radar system 12 providing front-looking capability of −60° coverage. FIG. 1 only shows the ±60° coverage in azimuth, which appears as a triangle with one corner at the radar 12. The front-looking radar also provides ±60° coverage in elevation so that the shape of the area covered is actually a cone with its apex at 12. Rear-looking radar system 14 is mounted on the rear of the aircraft and covers the remaining ±120° in azimuth and elevation so that together the two radar systems cover the spherical area surrounding the aircraft.

Figure 2:
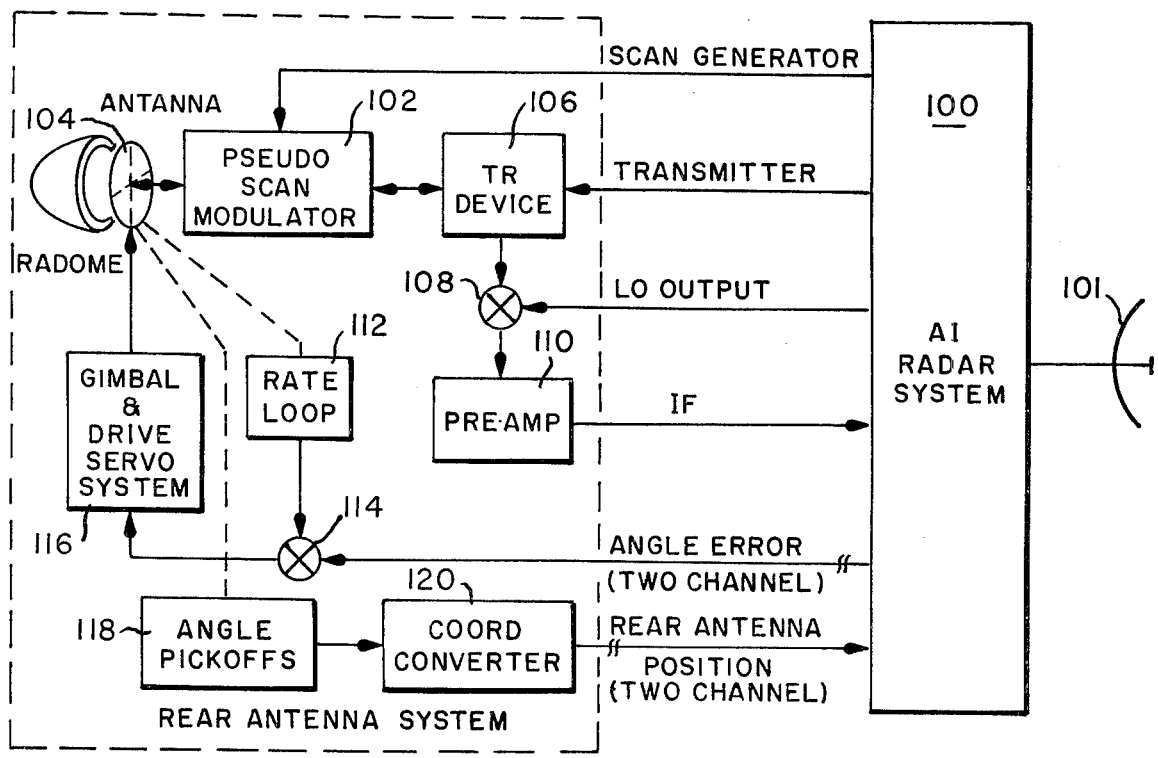
FIG. 2 shows in functional block diagram form the relationship of the rear antenna system to the AI radar system under rear-tracking conditions.

FIG. 2 shows the functional relationship between the rear antenna system and a typical AI radar system when rear-track conditions are in effect. Front-looking antenna 101 is de-energized and the transmitter output from AI radar system 100 is applied to rear antenna 104 via TR device 106 and pseudo-scan modulator 102 which also receives a signal from the AI scan generator. Energy received by the rear antenna is mixed with the radar local oscillator output in mixer 108 to produce an IF signal, amplified by preamp 110 and returned to the AI radar system. The target IF is amplified, normalized, range-tracked and angle-demodulated by the AI receiver. The error angle thus obtained is returned to the rear antenna system where it is applied to error detector 114. The error detector also receives the output of rate loop 112 and provides a signal to gimbal and drive servo system 116 to drive the antenna to an angle-track null. An independent rear servo system is employed to permit optimization of rear antenna system angle-track capabilities for the high dynamics of flyby maneuvers. The rear antenna rate loops are provided for inertial "writeoff" of own-ship angular rates. Rear antenna position is provided by angle pickoffs 118 and supplied to the AI radar system for front antenna slaving, a requisite condition for smooth initialization of front antenna tracking at handforward transfer. A coordinate converter 120 is employed if front and rear antenna coordinator systems are dissimilar.

Figure 3A:
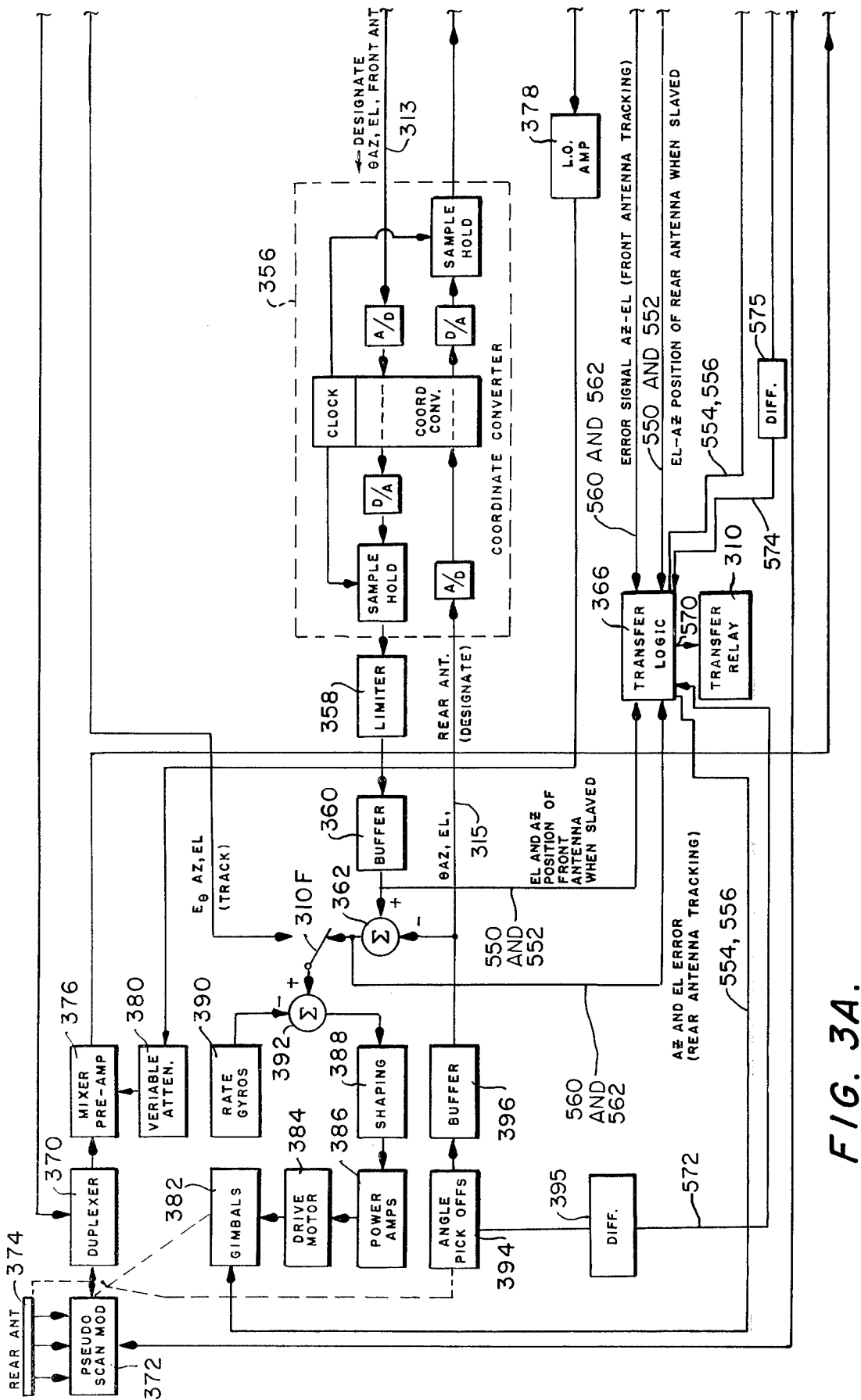
FIGS. 3A and 3B show a block diagram of the rear antenna system integrated with an APQ-72 radar.
Figure 3B:
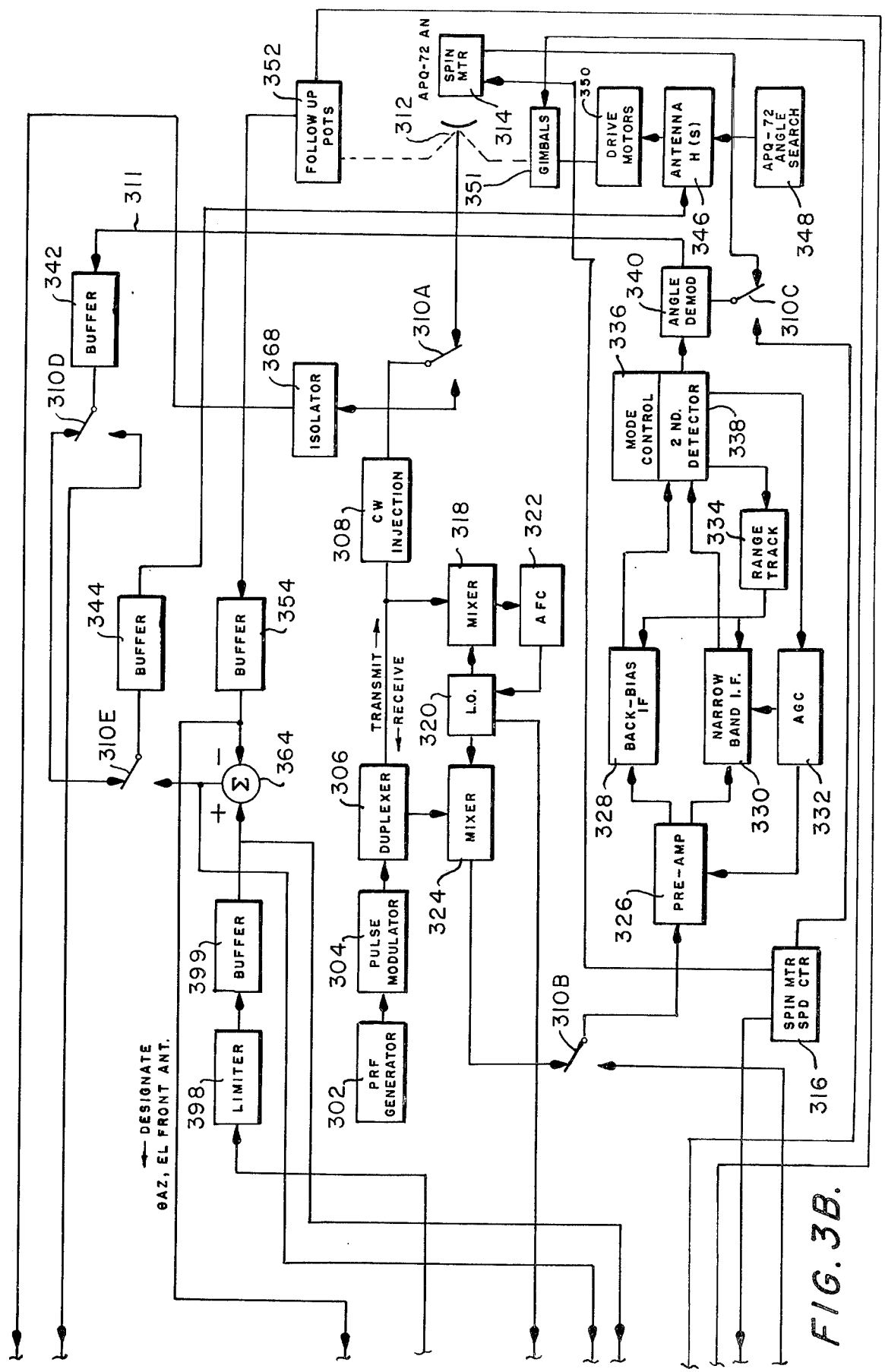

The functioning of a 360° radar track system and its implementation are best understood when considered in a specific application. A block diagram of the rear antenna system integrated with the APQ-72 radar is shown in FIGS. 3A and 3B. The APQ-72 is representative of present AI radar systems. The rear antenna system shown here is typical of what would be required on any aircraft; only detailed variations would be necessary as required to interface with a differently configured AI radar.

All switching in FIGS. 3A and 3B is shown in the front-track mode which employs the APQ-72 radar in an unmodified configuration. Transfer of the tracking function to the rear antenna system (handback) is accomplished by simultaneous switching of all switches shown to their alternate position. Handback and handforward switching is activated by transfer logic, which will be treated in detail in FIG. 5.

The unmodified APQ-72 radar will be briefly described before the rear antenna system is considered. The transmitted section comprises PRF generator 302, pulse modulator 304, duplexer 306, and CW injection section 308. The pulse to be transmitted passes through RF switch 310A to conically-scanned antenna 312. The spin motor 314, controlled by speed control 316, maintains the conical scan. The received energy passes back through switch 310A into mixers 318 and 324, and AFC circuit 322. The output of local oscillator 320 is fed into the mixers to generate an IF signal. The IF is passed through IF switch 310B to receiver signal processing circuits shown as IF pre-amp 326, back-bias IF circuit 328, narrow band IF circuit 330, second detector 338, range track 334, AGC circuit 332 and mode control 336. The output of second detector 338 is fed to angle demodulator 340 which also receives scan direction input from spin motor 314 through switch 310C. The angle demodulator sends the tracking error signal to the antenna motor system 346, 348, 350 and gimbals 351 which moves the antenna in the proper direction to maintain tracking. The error signal from angle demodulator 340 passes along line 311 through buffers 342 and 344, and switches 310D and 310E before reaching the antenna motor system.

The rear antenna system and its integration into the main AI radar circuits will now be described. When the rear antenna system is energized, all switches (310A – 310F) are in the alternate position to that shown in the drawing. With switch 310A in the alternate position, the transmitter output passes through isolator 368 to rear antenna duplexer 370, pseudo-scan modulator 372 to rear antenna 374. The pseudo-scan modulator uses an input from spin motor control 316 as a source of excitation coherent with front antenna nutation. The antenna is a phased array antenna having an approximate 12 inch aperture. Compatibility with a conically-scanned single channel AI radar establishes the requirement that the antenna output be single channel con-scan. To produce this output the face is organized by quadrants and the corresponding feed lines are modulated by ferrite devices. The technique is called pseudo con-scan.

The reflected energy received by the antenna is fed to mixer-preamplifier 376 which also receives the output of local oscillator 320 via amplifier 378 and variable attenuator 380. The mixer produces an IF signal which is sent to receiver pre-amp 326 via switch 310B in its alternate position. The receiver processes the signal in the normal manner as described above. Angle demodulator outputs on line 311 now pass through switches 310D and 310F in their alternate positions to error detector 392 which also receives an input from rate gyros 390. The error detector output is applied to gimbal drive circuits 388, 386 and 384 to drive gimbals 382 toward a null position.

In order to have a smooth transition during handforward or handback, it is necessary for the nontracking antenna to be slaved to the tracking antenna. Front antenna slaving, while in rear-track condition, is accomplished by driving the front antenna for a null comparison with rear antenna position. Signal limiting is employed to prevent driving the gimbals against their mechanical limits. Rear antenna slaving, while in a front-track condition, is similarly accomplished by slave commanding the rear servo systems instead. A coordinate converter is employed to affect coordinate transformation if the front and rear antenna coordinate systems are dissimilar.

In FIGS. 3A and 3B, the front antenna tracking condition is shown so the rear antenna is slaved to the front antenna. Follow-up pots 352 generate azimuth and elevation angle signals representative of the position of front antenna 312. The signals pass through buffer 354, along line 313 to the coordinate converter 356, to limiter 358, buffer 360 to error detector 362. The azimuth and elevation position of rear antenna 374 is sensed by angle pickoffs 394 and sent to error detector 362 via buffer 396. Error detector 362 produces a signal representative of the difference of position of the two antennas and feeds this as an error signal to error detector 392 through switch 310F. The rear antenna tracking null system then moves the gimbals toward the null position in the usual manner.

When the rear antenna tracking condition is in effect, the front antenna is slaved to the rear antenna. Switch 310F is in the alternate position so the rear antenna servo system is nulling the rear antenna position. The rear antenna position as sensed by angle pick-offs 394 is sent via line 315, coordinate converter 356, limiter 398 and buffer 399 to error detector 364. The outputs of front antenna follow-up pots 352 are also received by error detector 364. The error signal, which represents the difference in position of the two antennas is sent through switch 310E, in its alternate position, through buffer 344 to the front antenna drive system which drives the front antenna towards the null position. Note that in the alternate position of switch 310D, the azimuth and elevation error signal on line 311 goes only to the rear antenna system.

The position of the switches determines which antenna system is being used. The position of the switches is controlled by transfer relay 310 which is in turn controlled by transfer logic 366. As will be described in more detail with reference to FIGS. 4 and 5, the transfer logic circuitry receives position information and azimuth and elevation error information from the rear antenna via the Angle Pick-Offs block 394, the differentiator 395, and the line 572, and from the front antenna via the Follow-Up Pots block 352, the differentiator 575, and the line 574 and provides for handover switching at the proper time.

Figure 4:
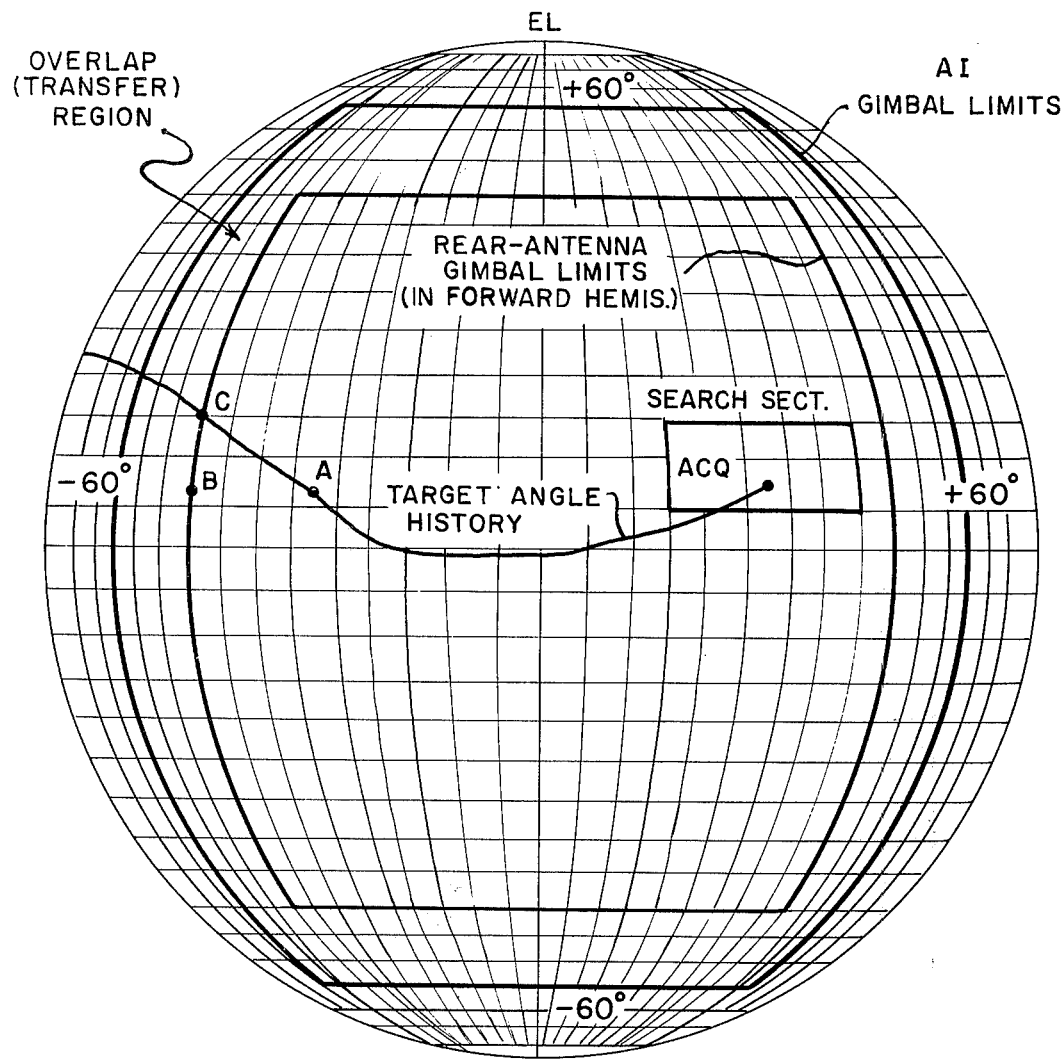
FIG. 4 illustrates a typical front-to-rear transfer sequence.

Spherical angle coverage of a typical AI radar is shown in FIG. 4, along with forward hemisphere coverage of the rear antenna. The angular coverage of the AI radar can be defined here as $\theta_{el} = \pm 60°$ and $\theta_{az} = \pm 60°$, as shown. As can be seen, the coverage overlaps somewhat in the transfer region. A typical front-to-rear transfer in the system of the invention is shown in FIG. 4 and will now be described.

The target is acquired by the AI radar in some search sector and moves along the "Target Angle History" line. With the system in the front radar track condition, the rear-antenna is enabled when the target reaches angle A, a predetermined number of degrees from the edge of the overlap area. The enable switch introduces a special slew time-constant or damping factor into the rear slave-track circuits for approximately one second, thereby preventing rear gimbal damage from overshoot into gimbal stops. The rear antenna thus slews in a slow, overdamped manner to angle B. This is so because the target is within the elevation range of the rear radar gimbals as will always be the case since the rear radar covers a full ±90° in elevation. The rear antenna then proceeds to track the target in elevation. In azimuth it slave-tracks a limit voltage corresponding to azimuth angle B. When the target reaches angle C, it comes within the azimuth coverage of the rear antenna and front-to-rear transfer is effected during the time the target is in the overlap region.

Figure 5:
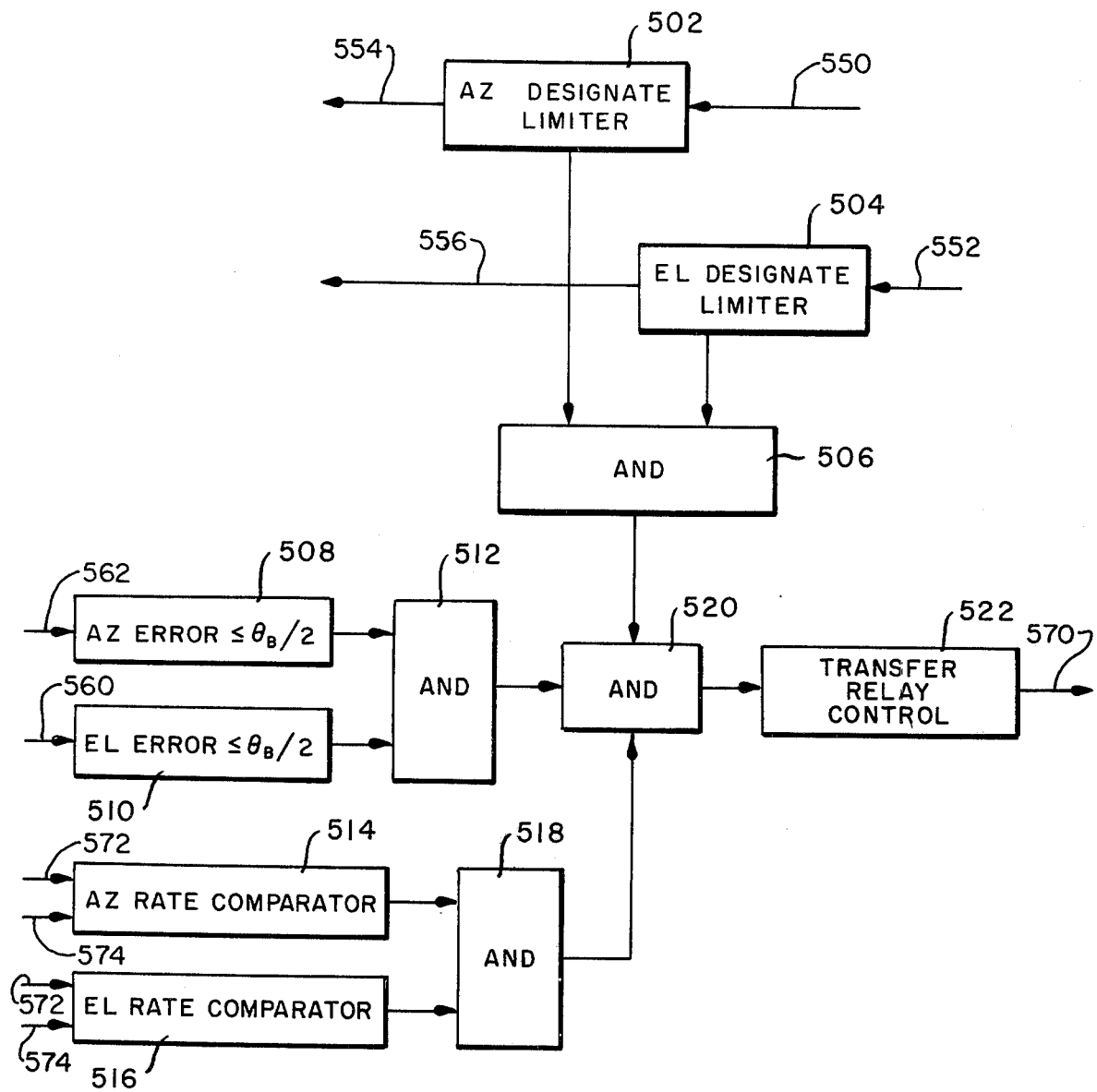
FIG. 5 shows a logic circuit for transferring the tracking function from the front to the rear antenna system.

A circuit for effecting the front-to-rear transfer is shown in FIG. 5 and its operation will be explained in reference to the transfer situation shown in FIG. 4. Both antennas are continuously powered with one antenna always in angle-track while the other is in slave-track. As described above, voltage limiters are placed in the designate lines 550 and 552 of the slaved antenna and limit the designate voltage to a value just below the travel limit of the slave gimbal. As the target reaches angle A, the rear antenna is enabled on line 556 and begins to track in elevation. The EL designate limiter 504 then sends a signal to the AND circuit 506 that the elevation gimbals are out of limit. As the target reaches angle C, the azimuth gimbals come out of limit on line 554 and AZ designate limiter 502 sends a signal to AND circuit 506, which now sends a signal to AND circuit 520. Comparator 508 receives azimuth slave error information on line 562 and comparator 510 receives elevation slave error information on line 560. The comparators send signals to AND circuit 512 when the errors are equal to or less than $\theta_B/2$, where $\theta_B$ is the beamwidth of the energized radar. This assures that the rear antenna is oriented accurately enough to pick up and track the target upon transfer. By the time the overlap region is reached, the elevation error should be small since the rear antenna has been tracking in elevation since the target was at angle A. However, the rear antenna only commences to track in azimuth at angle C. Therefore, comparator 508 will not send out a signal until the overlap region is reached. However, since a sudden change or sharp movement in azimuth may be necessary at angle C, the rear antenna may pass through and overshoot the proper azimuth position, and spend some time hunting for the proper position. Since the comparator 508 would send a signal to AND circuit 512 during the time when the rear antenna shoots through the proper position, comparators 514 and 516 are provided. These comparators compare the angular rates of the front antenna from line 574 and the rear antenna from line 572 in azimuth and elevation. When the angular rates are matched to within some predetermined error, signals are sent to AND circuit 518 which sends a signal to AND circuit 520 when it receives signals from both 514 and 516. Once all the conditions described have been met, AND circuit 520 sends a signal to close transfer relay control 522 which moves all the switches (310A to 310F shown in FIGS. 3A and 3B) to the aternate positions, thereby switching the tracking functions to the rear antenna.

Although the disclosed embodiment describes a rear antenna system which provides only a tracking function, it is clear that a natural extension of the system is to include search and acquisition capability. The rear antenna system shares the AI radar circuits on a time-shared basis, with either antenna assuming control if a target is acquired. To provide effective rear warning capability, the rear antenna system can be programmed to search a cone covering the regions in which enemy attacks are most likely to take place. In any event, the rear search capability provides the pilot with knowledge of the situation in the rear hemisphere which can be useful in many ways.

The radar system of the present invention also adds to the capability of an interceptor operating in an AI environment. A semi-active missile homes on a target after launch by means of signals directly from the interceptor radar as well as energy from the interceptor radar which has been reflected from the target. An interceptor having only a conventional AI front-looking radar can guide the missile only so long as the aircraft is moving toward the target. The aircraft must turn at some distance from the target to avoid being destroyed by the missile-target explosion. The present invention adds a launch and leave capability to present AI interceptors. The aircraft need not follow the missile after launch but can turn immediately and use the rear-looking radar to guide the missile. This means that with the rear-looking radar, the missile can now be guided for a much longer period of time in a conventional launch. It also permits the aircraft to launch the missile from a closer range since the aircraft need not follow the missile.

Obviously, many modifications and variations of the present invention are possible in light of the above teachings. It is therefore to be understood that, within the scope of the appended claims, the invention may be practiced otherwise than an specifically described.

What is claimed is:

1. A radar system comprising:
    a first antenna system capable of viewing a first region of space;
    a second antenna system capable of viewing a second region of space;
    a radar transmitter-receiver; and,
    means for selectively connecting said transmitter-reciver to the antenna systems;
    each of said antenna system including means for generating electrical signals representative of the azimuth and elevation position of the antennas; and said means for selectively connecting said transmitter-receiver to the antenna systems including means for receiving said electrical signals and for switching the connection from the connected antenna system to the unconnected antenna system when said electrical signals indicate that the connected antenna system has neared the periphery of its region of space.

2. The radar system of claim 1 wherein:
    said radar system is mounted on an aircraft;
    said first antenna system has a field of view to the front of the aircraft;
    said second antenna system has a field of view to the rear of the aircraft; and,
    said first and second regions of space together comprise the sphere of space surrounding the aircraft.

3. The radar system of claim 2 wherein:
    said first region comprises approximately ±60° in azimuth and elevation; and,
    said second region comprises approximately ±120° in azimuth and elevation.

4. The radar system of claim 2 wherein the first and second regions of space have a common overlap region.

5. The radar system of claim 1 wherein said transmitter-receiver connecting means comprises:
    a plurality of switches, each having; a terminal permanently connected to the transmitter-receiver, first and second contacts permanently connected to the first and second antenna system respectively, and a movable contact connected to the terminal and movable between the first and second contacts; and,
    means for moving all of the movable contacts simultaneously.

6. The radar system of claim 1 further comprising means for scanning the second antenna in a manner compatable with the first antenna scan.

7. The radar system of claim 6 wherein:
    the first and second antenna system use different coordinate systems; and,
    a coordinate convertor is connected between the antenna systems.

8. A radar system comprising:
    a first antenna system capable of viewing a first region of space;
    a second antenna system capable of viewing a second region of space;
    a radar transmitter-receiver including means for tracking a target in azimuth and elevation; and
    means for selectively connecting said transmitter-receiver to the antenna systems and for changing the connection from the connected antenna system to the unconnected antenna system as the target is leaving one region of space and entering the other region of space.

9. The radar system of claim 8 wherein:
    said first and second regions of space overlap; and
    the transmitter receiver connecting means comprises:
    means for initiating tracking in elevation and azimuth when the target reaches certain predetermined elevation and azimuth limits;
    means for comparing the error between the tracking elevation and azimuth of said first antenna system and the tracking elevation and azimuth of said second antenna system and determining when this error drops below a certain predetermined number in value;
    means for comparing the angular rates of tracking of said first and second antenna systems and determining when these angular rates are matched to within some predetermined error;
    means for switching from the connected to the unconnected antenna system in the overlap region when the tracking elevation and azimuth are within the predetermined limits, the error between the tracking elevation and azimuth of the first antenna system and tracking elevation and azimuth of the second antenna system drops below a predetermined number, and the angular rates of the two antenna systems are matched to within some predetermined error.

* * * * *